(12) United States Patent
Yamazaki et al.

(10) Patent No.: US 9,842,481 B1
(45) Date of Patent: Dec. 12, 2017

(54) APPARATUS AND METHOD TO COLLECT DEVICE INFORMATION PUBLISHED IN PAST TIMES VIA A NETWORK OF GATEWAYS

(71) Applicant: FUJITSU LIMITED, Kawasaki-shi, Kanagawa (JP)

(72) Inventors: Masanori Yamazaki, Kawasaki (JP); Kazuhito Matsuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/601,176

(22) Filed: May 22, 2017

(30) Foreign Application Priority Data

Jun. 9, 2016 (JP) .................................. 2016-115738

(51) Int. Cl.
| | |
|---|---|
| G08B 1/08 | (2006.01) |
| G08B 21/02 | (2006.01) |
| H04W 4/02 | (2009.01) |
| H04W 64/00 | (2009.01) |
| H04L 12/26 | (2006.01) |

(52) U.S. Cl.
CPC ..... *G08B 21/0272* (2013.01); *G08B 21/0277* (2013.01); *H04L 43/106* (2013.01); *H04W 4/025* (2013.01); *H04W 64/003* (2013.01)

(58) Field of Classification Search
CPC ............ G08B 21/0272; H04L 43/106; H04W 64/003; H04W 4/025
USPC .................................................. 340/539.15
See application file for complete search history.

(56) References Cited

U.S. PATENT DOCUMENTS

| | | | | |
|---|---|---|---|---|
| 7,587,517 B2 * | 9/2009 | Huang | .................. | H04L 45/302 709/224 |
| 2002/0004844 A1 * | 1/2002 | Harari | .................... | G06Q 10/10 709/238 |
| 2013/0297790 A1 * | 11/2013 | Ashihara | ................. | H04L 45/42 709/224 |

FOREIGN PATENT DOCUMENTS

| | | |
|---|---|---|
| JP | 11-289574 | 10/1999 |
| JP | 2009-163753 | 7/2009 |
| WO | WO 03/083703 A1 | 10/2003 |
| WO | WO 2004/006486 A2 | 1/2004 |

* cited by examiner

*Primary Examiner* — Tanmay Shah
(74) *Attorney, Agent, or Firm* — Staas & Halsey LLP

(57) ABSTRACT

Gateways transfer data between publishers and subscribers. Upon receiving an acquisition request for acquiring device-information from a subscriber, a first gateway stores, as routing-information, a matching condition for transferring device-information and a transfer-destination address, and transfers the acquisition request. Upon receiving device-information issued by a publisher, the second gateway stores the device-information in association with a reception time of the device-information, adds, to the routing information, a matching result including a source address of the device-information and the reception time, and transfers the device-information through gateways to the first gateway, according to the routing information. When the acquisition request includes a time condition related to past time, the first gateway generates an accumulating area for accumulating device-information, and when device-information is acquired in response to the acquisition request, accumulates the acquired device-information in the accumulating area, and transmits the accumulated device-information to the subscriber after a predetermined time has elapsed.

4 Claims, 13 Drawing Sheets

FIG. 3

| DeviceID | Key | Value | Timestamp |
|----------|-------------|-------|-----------|
| Dev001 | TEMPERATURE | 28°C | hh:mm:ss |
| Dev002 | BEACON ID | be002 | hh:mm:ss |
| ... | ... | ... | ... |

| MATCH CONDITION | nexthop | MATCHING RESULT |
|---|---|---|
| x > 10 | $GW_3$ | {:src=$GW_2$, :time=hh:mm:ss}, {···}, ··· |
| x < 5 | $GW_4$ | ··· |
| ··· | ··· | ··· |

| MATCH CONDITION | nexthop | MATCHING RESULT |
|---|---|---|
| x > 10 | $GW_1$ | {:src=$dev_1$, :time=hh:mm:ss}, {···}, ··· |
| ··· | ··· | ··· |

US 9,842,481 B1

APPARATUS AND METHOD TO COLLECT DEVICE INFORMATION PUBLISHED IN PAST TIMES VIA A NETWORK OF GATEWAYS

CROSS-REFERENCE TO RELATED APPLICATION

This application is based upon and claims the benefit of priority of the prior Japanese Patent Application No. 2016-115738, filed on Jun. 9, 2016, the entire contents of which are incorporated herein by reference.

FIELD

The embodiment discussed herein is related to apparatus and method to collect device information published in past times via a network of gateways.

BACKGROUND

In recent years, there has been an increased interest in an Internet of Things (IoT). In IoT, not only a personal computer (PC), a server, and a smart device but also various things in the world are coupled to the Internet as IoT devices. Examples of IoT devices include an environmental sensor, a beacon (a radio transmitter), a vehicle, a home electrical appliance, and the like.

As an application example of IoT, there is an information providing service using an IoT device. FIG. 12 is a diagram illustrating a child watch system as an example of an information providing service. The child watch system illustrated in FIG. 12 traces a place where a child is using a beacon 91 carried by the child and provides information about the place where the child is.

In the child watch system, a gateway (GW) 93 receives information transmitted by the beacon 91 carried by the child via a smartphone 92 carried by another person. Note that, although, in FIG. 12, as the smartphone 92 via which the information is received by the GW 93, only a single smartphone 92 is illustrated, the number of smartphones 92 via which the information is received by the GW 93 may be two or more.

The GW 93 is a device that accommodates IoT devices that are distributed in a wide range and relays functions and data of the IoT devices, and is, for example, a Wi-Fi access point or a base station of a mobile network. The GW 93 transmits received information to a data center (DC) 94. Note that, although, in FIG. 12, as the GW 93 via which the information is transmitted to the DC 94, only a single GW 93 is illustrated, the number of GWs 93 via which the information is transmitted to the DC 94 may be two or more.

The DC 94 accumulates information transmitted from various IoT devices as well as information transmitted by the beacon 91. A distribution system including the GW 93 and the DC 94 provides an infrastructure, that is, an IoT service infrastructure, of an IoT service that provides information using the IoT devices.

The IoT service infrastructure provides a retrieval service and a notification service. In the retrieval service, for example, when a guardian of a child requests an IoT service infrastructure to perform a retrieval of a place where the child is, by using the smartphone 92 carried by the guardian, the IoT service infrastructure retrieves data in the DC 94 and provides information about the place where the child is, to the guardian (CASE #1). The IoT service infrastructure may be configured to accumulate information transmitted by the beacon 91 in the GW 93, retrieve data in the GW 93, and provide information about the place where the child is, to the guardian (CASE #2).

In the notification service, for example, an activity range of the child is detected and registered in the IoT service infrastructure in advance and, when the child moves a location that is largely different from the activity range, the IoT service infrastructure notifies the guardian. Whether or not the IoT service infrastructure is to notify the guardian is determined by the DC 94 (CASE #1) or the GW 93 (Case #2).

In the retrieval service, accumulation type data provision in which data accumulated in the GW 93 or the DC 94 is retrieved in accordance with a condition and data that matches the condition is provided is performed. Also, in the retrieval service, data is provided in synchronization with a retrieval request, and therefore, synchronization type data provision is performed. On the other hand, in the notification service, real-time type data provision in which, when data that matches a condition that has been registered in advance is received, the data is provided is performed. Also, in the notification service, non-synchronization type data provision in which specification of a condition and provision of data are not synchronized with one another is performed.

The amount of data that is accumulated in accumulation type data provision is much larger, compared to the number of conditions used in real-time type data provision, and therefore, it takes a longer time to complete processing of accumulation type data provision than a time which it takes to complete processing of real-time type data provision. Therefore, in many cases, real-time type data provision is used.

As a system that performs real-time type data provision, a publisher (Pub)/subscriber (Sub) system is used. FIG. 13 is a diagram illustrating a Pub/Sub system. As illustrated in FIG. 13, in the Pub/Sub system, a publisher 95 and a subscriber 97 are coupled by a topic 96.

For the topic 96, the publisher 95 transmits data. For the topic 96, the subscriber 97 requests subscription and receives data. In the subscription, a match condition used for filtering data is specified. The Pub/Sub system is capable of loosely coupling the publisher 95 and the subscriber 97 together, and therefore, there may be cases where the publisher 95 and the subscriber 97 are not aware the existence or the states of each other. The Pub/Sub system enables a many-to-many communication.

Furthermore, the Pub/Sub system is capable of providing past data that matches a condition at the time when the subscriber 97 started subscription, by using a delay queue. FIG. 14 is a diagram illustrating a delay queue. As illustrated in FIG. 14, the GW 93 inputs data published by the Pub 95 to a delay queue 98 to delay the data by a predetermined time, and then, transmits the data to the Sub 97.

Therefore, the Sub 97 is capable of acquiring old data stored in the delay queue 98. As described above, in the Pub/Sub system, by using the delay queue 98, the Sub 97 is enabled to acquire information of a stray child retrospectively, for example, in a child watch system.

Note that there is a technology in which a router of an issue-subscription network caches data and, after a sustained time frame period has elapsed, erases the cached data, and thereby, sustained caching is realized.

Also, there is a technology in which an area of a terminal device is determined, based on a received terminal ID, a base station ID, and a communication available range of the base station ID, and, when the determined area matches a condition registered in advance, the area is notified in accordance with a registered notification method, and thereby, notification and various controls in accordance with a specified notification method are easily realized.

Japanese Laid-open Patent Publication No. 2009-163753 and Japanese Laid-open Patent Publication No. 11-289574 discuss related art.

SUMMARY

According to an aspect of the invention, an apparatus operates as each of gateway devices that transfer data between publisher devices and subscriber devices. Upon receiving a first acquisition request for acquiring device information issued by the publisher devices, the apparatus stores a pair of a matching condition and a transfer-destination address, as routing information, in a routing-information area, where the matching condition is a condition that is to be satisfied by device information for transferring the device information to a subscriber device that has issued the first acquisition request, and transfers the first acquisition request to a predetermined gateway device adjacent to the apparatus by setting an address of the apparatus to the transfer-destination address in the first acquisition request. Upon receiving device information from a publisher device, the apparatus stores the received device information in a device-information area, in association with a reception time of receiving the device information from the publisher device, perform a matching-result addition process of adding, to the routing information, a matching result including a pair of an address of the publisher device as a source address of the device information and the reception time of the device information, and transfers the device information to a transfer destination whose address is stored as the routing information in association with the address of the publisher device. Upon receiving device information from a gateway device adjacent to the apparatus, the apparatus performs the matching result addition process of adding, to the routing information, a matching result including a pair of an address of the gateway device as a source address of the device information and a reception time of receiving the device information from the gateway device, and transfers the device information to a transfer destination whose address is stored as the routing information in association with the address of the gateway device. Upon receiving, from a subscriber device, a second acquisition request including a time condition related to past time, the apparatus generates a device-information accumulating area for accumulating device information that was received in past times, in relation to the second acquisition request. In a case where a matching result that satisfies the time condition included in the second acquisition request is stored as the routing information in the routing information area, the apparatus transfers the second acquisition request to a gateway device of the source address when a source address associated with the matching result does not indicate a publisher device. The apparatus reads out, from the device information area, device information that has been received from the publisher device and stored in the device information area when the source address associated with the matching result indicates a publisher device, and accumulates the device information in the device-information accumulating area. In a case where device information is acquired in response to the second acquisition request that has been transferred from the apparatus, the apparatus accumulates the acquired device information in the device-information accumulating area, and after a predetermined time has elapsed since the device-information accumulating area was generated, rearranges device information accumulated in the device-information accumulating area in chronological order, and transmits the rearranged device information to the subscriber device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a device information accumulation unit, according to an embodiment;

DESCRIPTION OF EMBODIMENT

In the IoT service infrastructure, published data is accumulated in the nearest GW 93 to the publisher. Therefore, in a method using the delay queue 98, when data is accumulated in one of GWs 93 by using the delay queue 98, the amount of data that is to be held by the IoT service infrastructure is doubled, and the amount of data is increased.

In view of the foregoing, it is considered as an option to provide past data by using data accumulated in the nearest GW 93 to the publisher without using the delay queue 98. However, there is a problem in which, when past data is requested by a subscriber, in which one of the GWs 93 the requested data is accumulated is not known, and therefore, all of the GWs 93 is requested to acquire past data, so that the loads of the GWs 93 are increased.

It is desirable to enable transmission of a request for acquiring past data only to limited one or ones of GWs.

An embodiment for a past information providing program, a past information providing method, and a past information providing device disclosed herein will be described in detail below with reference to the accompanying drawings. Note that the embodiment described below is not intended to limit the technology disclosed herein.

Embodiment

Figure 1:
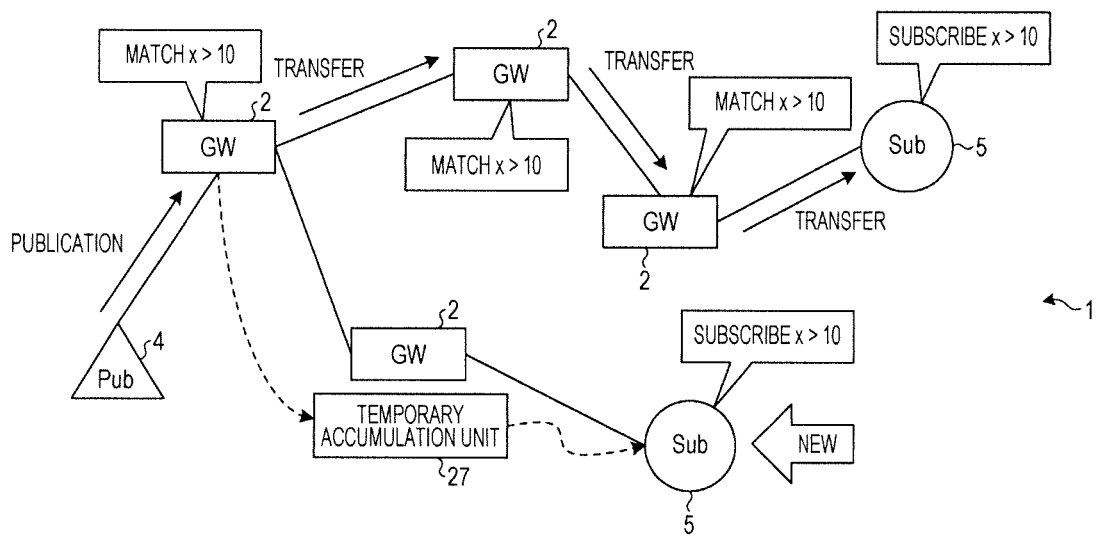
FIG. 1 is a diagram illustrating an example of a past information providing system, according to an embodiment.

First, a past information providing system according to an embodiment will be described. FIG. 1 is a diagram illustrating a past information providing system according to the embodiment. As illustrated in FIG. 1, a past information providing system 1 according to the embodiment includes four GWs 2, a single Pub 4, and two Subs 5. Note that the past information providing system 1 may include more GWs 2, Pubs 4, Subs 5.

Each of the GWs 2 is a device that relays a function or data of the Pub 4 distributed in a wide range and, for example, is a Wi-Fi access point or a base station of a mobile network. The Pub 4 is a device that publishes information to one of the GWs 2. Each of the Subs 5 is a device that requests one of the GWs 2 for subscription.

For example, it is assumed that, under a condition of x>10, one of the Subs 5 requests one of the GWs 2 for subscription. Then, the GW 2 that has been requested for subscription transmits the condition to another one of the GWs 2 and requests the another GW 2 to transfer data that matches the condition to a self-device, that is, the GW 2 that has been requested for subscription. Similarly, the GW 2 to which the condition has been transmitted transmits the condition to still another one of the GWs 2 and requests the still another GW 2 to transfer data that matches the condition to a self-device, that is, the GW 2 that has transmitted the condition.

Then, when the Pub 4 publishes data that matches x>10, one of the GWs 2 to which the data has been transmitted from the Pub 4 accumulates the data and also transfers the matching data to another GW 2 that has transmitted a transfer request for transferring the data that matches x>10. Also, the GW 2 stores, as a matching result, an acquisition source from which the match data was acquired and a publication time at which the data was published. Note that it is assumed that the publication time at which data is published and a time at which the GW 2 that is adjacent to the Pub 4 receives data are the same.

The GW 2 to which data has been transferred transfers the matching data to the GW 2 that has transmitted the transfer request for transferring data that matches x>10. Also, the GW 2 to which data has been transferred stores, as a matching result, the acquisition source from which the matching data was acquired and the publication time at which the data was published. Then, when the data has been transferred up to the GW 2 that has been requested for subscription by the Sub 5, the GW 2 that has been requested for subscription by the Sub 5 transfers the matching data to the Sub 5 and stores, as a matching result, the acquisition source and the publication time of the matching data.

When, under the condition of x>10, another Sub 5 newly requests one of the GWs 2 for subscription including subscription of past data, the GW 2 that has been requested for subscription including subscription of the past data generates a temporary accumulation unit 27 that temporarily stores matching data and requests an adjacent GW 2 to retrieve past data.

The GW 2 that has been requested to retrieve past data, if the GW 2 has the matching result, requests another GW 2 that is an acquisition source to retrieve past data until the acquisition source included in the matching result becomes the Pub 4. Then, when the acquisition source included in the matching result is the Pub 4, the another GW 2 transmits the matching data to the temporary accumulation unit 27 of the GW 2 that has been requested for subscription by the Sub 5, so as to accumulate the matching data. The GW 2 that has been requested for subscription by the Sub 5 waits for the past data to be transferred thereto and, after a predetermined time has elapsed, sequentially transmits the data stored in the temporary accumulation unit 27 to the Sub 5 in chronological order.

As described above, in the past information providing system 1, the GWs 2 store matching results. The GW 2 that has been requested for subscription including subscription of past data generates the temporary accumulation unit 27 and also transmits a retrieval request for retrieving the past data to an adjacent GW 2. Then, the GW 2 that has been requested for retrieve the past data, if the GW 2 has the matching result, transfers a retrieval request for retrieving the past data up to the GW 2 in which the corresponding data has been accumulated, based on the matching result. Then, the GW 2 in which the data has been stored transmits the data to the temporary accumulation unit 27 of the GW 2 that has been requested for subscription by the Sub 5.

Therefore, the past information providing system 1 is capable of reducing the amount of data that is accumulated, as compared to a case where a delay queue is used. Also, the past information providing system 1 requests only some of the GWs 2 to acquire past data, based on a matching result, so that loads of the GWs 2 are not increased.

Note that storing a matching result in all of GWs 2 on a data distribution path causes redundancy and a large waste is incurred. On the other hand, if there are only a few GWs 2 that store a matching result, it takes a long time to determine the existence of the GW 2 that stores target data. That is, there is a trade-off relation between the number of GWs 2 that store a matching result and a retrieval time for retrieving the past data.

In view of the foregoing, the past information providing system 1 is configured to store a matching result, based on geographical locality of data use. That is, the past information providing system 1 is configured to store a matching result, based on a characteristic that it is highly possible that data is used near a place where the data is generated.

Therefore, the GWs 2 hold a matching result with a probability calculated based on 1/(the number of transfer hops)+(a constant). That is, as data is transferred from the Pub 4 to the GW 2 located far, the GW 2 does not leave a matching result. As described above, the past information providing system 1 stores a matching result, based on geographical locality of data use, and thereby, a retrieval time for retrieving the past data may be reduced without increasing the number of GWs 2 that store a matching result.

Figure 2:
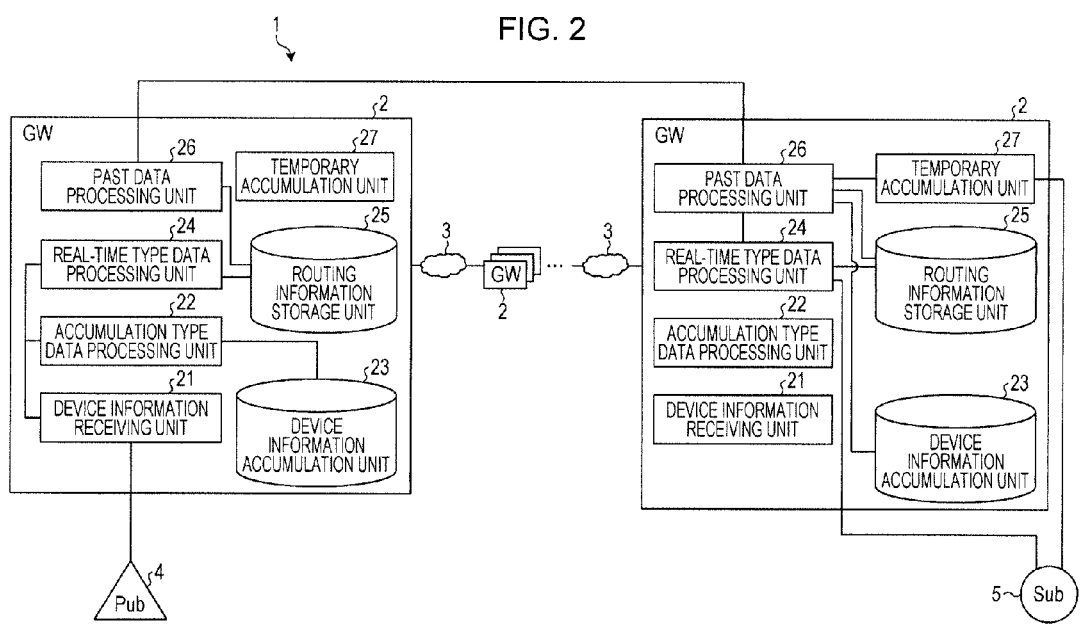
FIG. 2 is a diagram illustrating an example of a configuration of a past information providing system, according to an embodiment.

Next, a configuration of the past information providing system 1 will be described. FIG. 2 is a diagram illustrating a configuration of the past information providing system 1. As illustrated in FIG. 2, the past information providing system 1 includes an arbitrary number of GWs 2, Pubs 4, and Subs 5. The GWs 2 are coupled with one another via a network (NW) 3.

Note that, although, in FIG. 2, a single Pub 4 and a single Sub 5 are illustrated, each of the GWs 2 may accommodate an arbitrary number (including 0) of Pubs 4 and Subs 5. In FIG. 2, as for the GW 2 that is adjacent to the Pub 4, an operation performed when the GW 2 receives data from Pub 4 is mainly illustrated and, as for the GW 2 that is adjacent to the Sub 5, an operation performed when the GW 2 receives a subscription request from the Sub 5 is mainly illustrated. Each of the GWs 2 operates when the GW 2 receives data from the Pub 4, when the GW 2 receives a subscription request from the Sub 5, and when the GW 2 receives data, an update request for updating information, a retrieval request for retrieving the past data, or the like from another GW 2.

Each of the GWs 2 includes a device information receiving unit 21, an accumulation type data processing unit 22, a device information accumulation unit 23, a real-time type data processing unit 24, a routing information storage unit 25, a past data processing unit 26, and the temporary accumulation unit 27.

The device information receiving unit 21 receives data published by the Pub 4 as device information and passes the received data to the accumulation type data processing unit 22 and the real-time type data processing unit 24.

The accumulation type data processing unit 22 stores the data received from the device information receiving unit 21 in the device information accumulation unit 23. The device information accumulation unit 23 stores the data received from the Pub 4 by the device information receiving unit 21.

FIG. 3 is a table illustrating an example of the device information accumulation unit 23. As illustrated in FIG. 3, the device information accumulation unit 23 stores DeviceID, Key, Value, and Timestamp for each data. DeviceID is an identifier that identifies the Pub 4 that has published data. Key is the name of the data. Value is the value of the data. That is, the data is a combination of Key and Value. Timestamp is a time at which the data was published.

For example, the Pub 4 that is identified by "Dev001" publishes data indicating that "TEMPERATURE" is "28 t" at a time "hh:mm:ss" and the accumulation type data processing unit 22 stores the data in the device information accumulation unit 23.

Figures 4A, 4B, 4C:
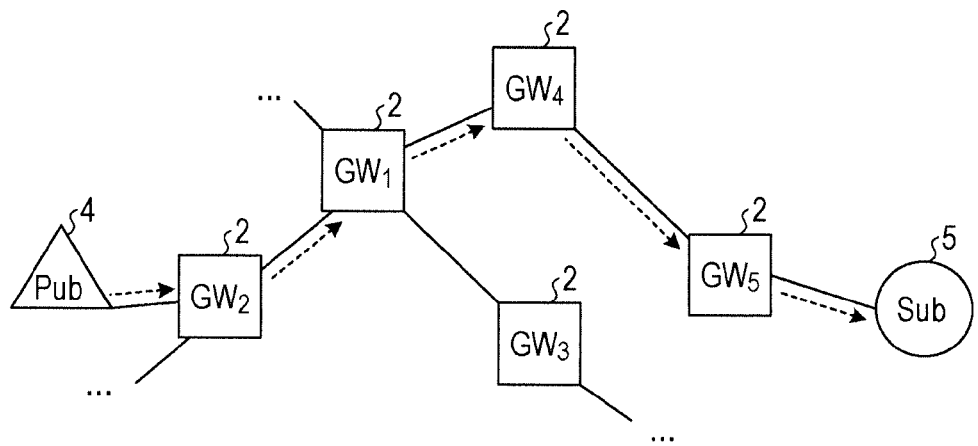
FIGS. 4A, 4B, and 4C are diagrams illustrating an example of routing information, according to an embodiment.

The real-time type data processing unit 24 performs processing related to real-time type data provision. Specifically, when the real-time type data processing unit 24 receives a subscription request from the Sub 5, the real-time type data processing unit 24 updates the routing information of the routing information storage unit 25. The routing information storage unit 25 stores the routing information. FIGS. 4A-4C are diagrams illustrating an example of the routing information that is stored by the routing information storage unit 25. FIG. 4C illustrates the routing information of $GW_2$ that is adjacent to the Pub 4 and FIG. 4B illustrates the routing information of $GW_1$ that is adjacent to $GW_2$.

The routing information includes a match condition, nexthop, and a matching result. The match condition is a condition included in a subscription request transmitted from the Sub 5. nexthop is a transfer destination of data and also a transmission source of the match condition. In the GW2 that has received a subscription request from the Sub 5, nexthop is the Sub 5. In the GW 2 to which the match condition is transferred from another GW 2, nexthop is a transmission source of the match condition.

The matching result indicates an acquisition source and a publication time of data that matches the match condition. There may be a plurality of matching results. ":src=" indicates the acquisition source and ":time=" indicates the publication time.

For example, in the routing information of $GW_1$, data that matches "x>10" is transferred to $GW_3$ and data which was transferred from $GW_2$ and the publication time of which is "hh:mm:ss" is registered as matching data in the matching result.

When there is an adjacent GW 2 to which the match condition is to be transferred, the real-time type data processing unit 24 transfers the match condition and a self-device name as update information of the routing information to a transfer destination. The transfer destination is specified as a child node on a broadcast tree.

When the subscription request includes subscription of the past data, the real-time type data processing unit 24 removes a time condition that designates a subscription time range of the past data, from the subscription request, and transfers the match condition as update information of the routing information to the transfer destination. Also, the real-time type data processing unit 24 performs retrieval of the past data, based on the subscription request including the time condition.

The real-time type data processing unit 24 receives data that has been transmitted from the Pub 4 or the adjacent GW 2, and then, when a GW 2 that serves as a next transfer destination does not exist, the real-time type data processing unit 24 transmits the data to the Sub 5. On the other hand, when the GW 2 that serves as the next transfer destination exists, the real-time type data processing unit 24 adds, for the data transmitted from the Pub 4, a combination of the acquisition source and the publication time of the data to a corresponding match result and transfers the data to the next transfer destination. For the data transferred from the adjacent GW 2, the real-time type data processing unit 24 determines whether or not the matching result is to be left, based on a probability calculated from the number of transfer hops and, if the matching result is to be left, adds the combination of the acquisition source and the publication time of the data to the corresponding matching result and transfers the data to the next transfer destination.

When the subscription request includes subscription of the past data, the past data processing unit 26 performs processing of retrieving the past data. The past data processing unit 26 of the GW 2 that has received the subscription request from the Sub 5 generates the temporary accumulation unit 27. The temporary accumulation unit 27 is a storage unit that temporarily stores data that matches a subscription condition included in the subscription request until a certain time has elapsed since the data was generated. In this case, matching a subscription condition is matching a match condition included in a subscription request and also satisfying a time condition included in the subscription request. When a certain time has elapsed, the temporary accumulation unit 27 is deleted after data stored by the temporary accumulation unit 27 has been transmitted to the Sub 5.

When there is a matching result that matches the subscription condition and the acquisition source included in the matching result that matches the subscription condition is the Pub 4, the past data processing unit 26 of the GW 2 that has received the subscription request from the Sub 5 stores matching data in the temporary accumulation unit 27. When the acquisition source included in the matching result that matches the subscription condition is not the Pub 4, the past data processing unit 26 of the GW 2 that has received the subscription request from the Sub 5 transmits a retrieval request for retrieving the past data with the subscription condition to the GW 2 that is the acquisition source included in the matching result. Then, upon receiving the past data that is transmitted from another GW 2 that has received the retrieval request for retrieving the past data, the past data processing unit 26 of the GW 2 that has received the subscription request from the Sub 5 stores the received past data in the temporary accumulation unit 27.

Note that, when there is a plurality of matching results that match the subscription condition, the past data processing unit 26 of the GW 2 that has received the subscription request from the Sub 5 performs similar processing on each of the matching results. When there is no matching result that matches the subscription condition, the past data processing unit 26 of the GW 2 that has received the subscription request from the Sub 5 transmits a retrieval request for retrieving the past data with the subscription condition to an adjacent GW 2.

When there is a matching result that matches the subscription condition and the acquisition source included in the matching result that matches the subscription condition is the Pub 4, the past data processing unit 26 of the GW 2 that has been requested to retrieve the past data by the adjacent GW 2 transfers matching data to the GW 2 that has generated the temporary accumulation unit 27. The past data processing unit 26 of the GW 2 including the temporary accumulation unit 27 stores the transferred data in the temporary accumulation unit 27. When the acquisition source is not the Pub 4, the past data processing unit 26 of the GW 2 that has been requested to retrieve the past data by the adjacent GW 2 transmits a retrieval request for retrieving the past data with the subscription condition to the GW 2 that is the acquisition source included in the matching result that matches the subscription condition.

Note that, when there is a plurality of matching results that match the subscription condition, the past data processing unit 26 of the GW 2 that has been requested to retrieve the past data by the adjacent GW 2 performs similar processing on each matching result. When there is no matching result that matches the subscription condition, the past data processing unit 26 of the GW 2 that has received the subscription request from the adjacent GW 2 transmits a retrieval request for retrieving the past data with the subscription condition to the adjacent GW 2.

Figure 5:
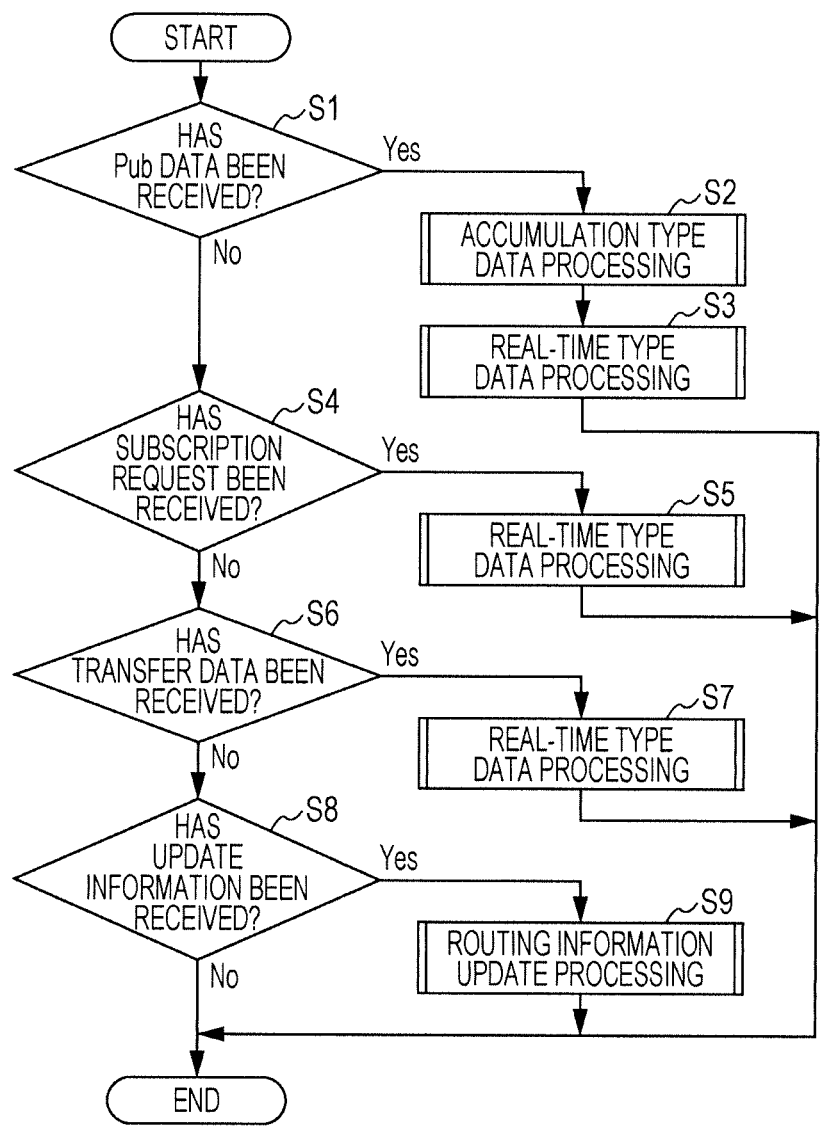
FIG. 5 is a diagram illustrating an example of an operational flowchart for processing of a gateway, according to an embodiment.

Next, a flow of processing of a GW 2 will be described. FIG. 5 is an example of an operational flowchart illustrating a flow of processing of a GW 2. As illustrated in FIG. 5, the GW 2 determines whether or not Pub data has been received (Step S1). In this case, receiving Pub data is receiving data from the Pub 4, and the receiving Pub data is specified by that a transmission source is the Pub 4. Transmission data transmitted by the Pub 4 includes DeviceID, Key, and Value.

When the Pub data has been received, the GW 2 performs accumulation type data processing of storing data in the device information accumulation unit 23 (Step S2) and performs real-time type data processing in order to transfer data that matches the match condition to the Sub 5 (Step S3).

On the other hand, when the Pub data has not been received, the GW 2 determines whether or not a subscription request has been received (Step S4). In this case, receiving a subscription request is receiving a subscription request from the Sub 5, and the receiving a subscription request is specified by that the transmission source is the Sub 5. Transmission data transmitted by the Sub 5 includes DeviceID that identifies the Sub 5 and a subscription condition. There might be a case where the subscription condition includes a time condition.

When the subscription request has been received, the GW 2 performs real-time type data processing in order to update routing information (Step S5). When the subscription condition includes the time condition, the GW 2 also performs retrieval of the past data in the real-time type data processing.

On the other hand, when the subscription request has not been received, the GW 2 determines whether or not transfer data has been received (Step S6). In this case, receiving transfer data is receiving data transferred from an adjacent GW 2, and the receiving transfer data is specified by receiving data from the adjacent GW 2. The transfer data transferred by the adjacent GW 2 includes DeviceID, Key, and Value.

When the transfer data has been received, the GW 2 performs real-time type data processing in order to transfer data that matches the match condition to the Sub 5 (Step S7). On the other hand, when the transfer data has not been received, the GW 2 determines whether or not update information has been received (Step S8). In this case, receiving update information is receiving update information of the routing information from the adjacent GW 2 and the receiving update information is specified by receiving the transfer data including a condition from the adjacent GW 2. The transfer data transferred by the adjacent GW 2 includes nexthop and the match condition. When the update information has been received, the GW 2 performs routing information update processing of updating the routing information (Step S9).

As illustrated above, the GW 2 selects one or two of processing from among accumulation type data processing, real-time type data processing, and routing information update processing, based on information of the transmission source and reception information, and executes the selected processing so that an IoT service infrastructure may be provided.

Figure 6:
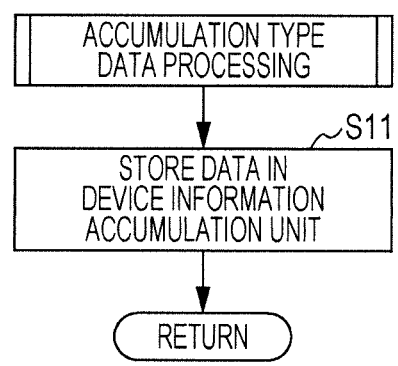
FIG. 6 is a diagram illustrating an example of an operational flowchart for accumulation type data processing, according to an embodiment.

Next, a flow of accumulation type data processing will be described. FIG. 6 is an example of an operational flowchart illustrating a flow of accumulation type data processing. Note that input parameters of accumulation type data processing are DeviceID, Key, and Value. As illustrated in FIG. 6, the accumulation type data processing unit 22 stores data with DeviceID and the time at which the data was received, in the device information accumulation unit 23, based on the input parameters (Step S11).

As described above, the accumulation type data processing unit 22 stores data with DeviceID and the time at which the data was received, in the device information accumulation unit 23, so that the past information providing system 1 may provide the past data to the Sub 5.

Figure 7:
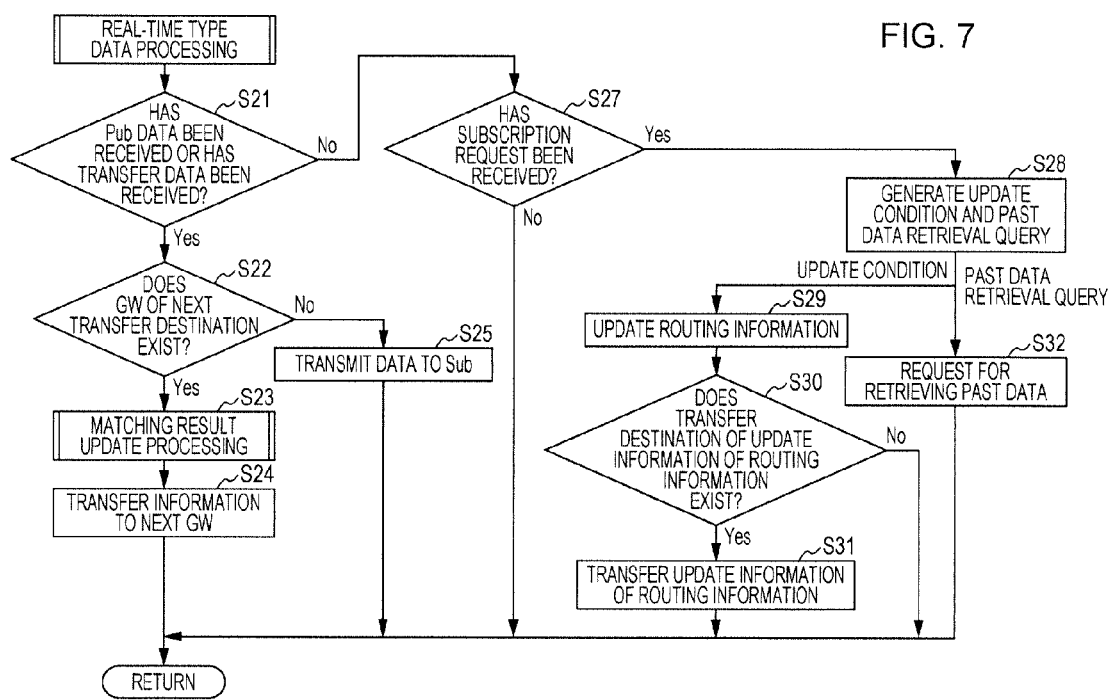
FIG. 7 is a diagram illustrating an example of an operational flowchart for real-time type data processing, according to an embodiment.

Next, a flow of real-time type data processing will be described. FIG. 7 is an example of an operational flowchart illustrating a flow of real-time type data processing. Note that, in the case of receiving the Pub data, input parameters of real-type type data processing are DeviceID, Key, and Values and, in the case of receiving the subscription request, the input parameters of real-type type data processing are DeviceID that identifies the Sub 5 and the subscription condition.

As illustrated in FIG. 7, the real-time type data processing unit 24 determines whether or not the Pub data has been received or whether or not the transfer data has been received (Step S21). When the Pub data has been received or the transfer data has been received, the real-time type data processing unit 24 determines whether or not the GW 2 that is the next transfer destination exists (Step S22) and, when the GW 2 that is the next transfer destination does not exist, transmits data to the Sub 5 (Step S25). On the other hand, when the GW 2 that is the next transfer destination exists (Step S23), the real-time type data processing unit 24 performs matching result update processing of updating the matching result (Step S23) and transfers the received information to the next GW 2 (Step S24).

When neither the Pub data nor the transfer data has been received, the real-time type data processing unit 24 determines whether or not the subscription request has been received (Step S27) and, when the subscription request has not been received, terminates processing.

On the other hand, when the subscription request has been received, the real-time type data processing unit 24 generates an update condition and a past data retrieval query from the subscription request (Step S28), where the update condition is the match condition used for updating the routing information, and the past data retrieval query is a retrieval request for retrieving the past data and includes the subscription condition and the time condition. Note that, when the subscription request does not include the time condition, the past data retrieval query is not generated.

For the update condition, the real-time type data processing unit 24 updates the routing information (Step S29) and determines whether or not a transfer destination of the update information of the routing information exists (Step S30). When the transfer destination of the update information of the routing information exists, the real-time type data processing unit 24 transfers the update information of the routing information (Step S31).

For the past data retrieval query, the real-time type data processing unit 24 requests the past data processing unit 26 to retrieve the past data (Step S32).

As described above, the real-time type data processing unit 24 processes the data published by the Pub 4, the data transferred from the adjacent GW 2, and the subscription request transmitted from the Sub 5, and thereby, the past information providing system 1 may perform real-time type data provision.

Figure 8:
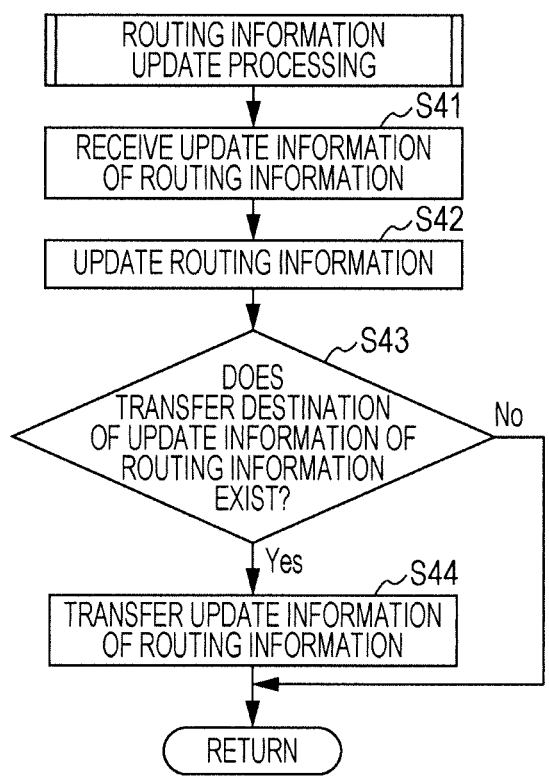
FIG. 8 is a diagram illustrating an example of an operational flowchart for routing information update processing, according to an embodiment.

Next, a flow of routing information update processing will be described. FIG. 8 is an example of an operational flowchart illustrating a flow of routing information update processing. Note that input parameters of the routing information update processing are nexthop and the match condition.

As illustrated in FIG. 8, the real-time type data processing unit 24 receives, as the update information of the routing information, nexthop and the match condition (Step S41). The real-time type data processing unit 24 updates the routing information (Step S42) and determines whether or not the transfer destination of the update information of the routing information exists (Step S43).

When the transfer destination of the update information of the routing information exists, the real-time type data processing unit 24 transfers the update information of the routing information, by setting the GW 2 including the real-time type data processing unit 24 as nexthop (Step S44).

As described above, each of the GWs 2 transfers the update information of the routing information, and thereby, the past information providing system 1 may update all pieces of the routing information.

Figure 9:
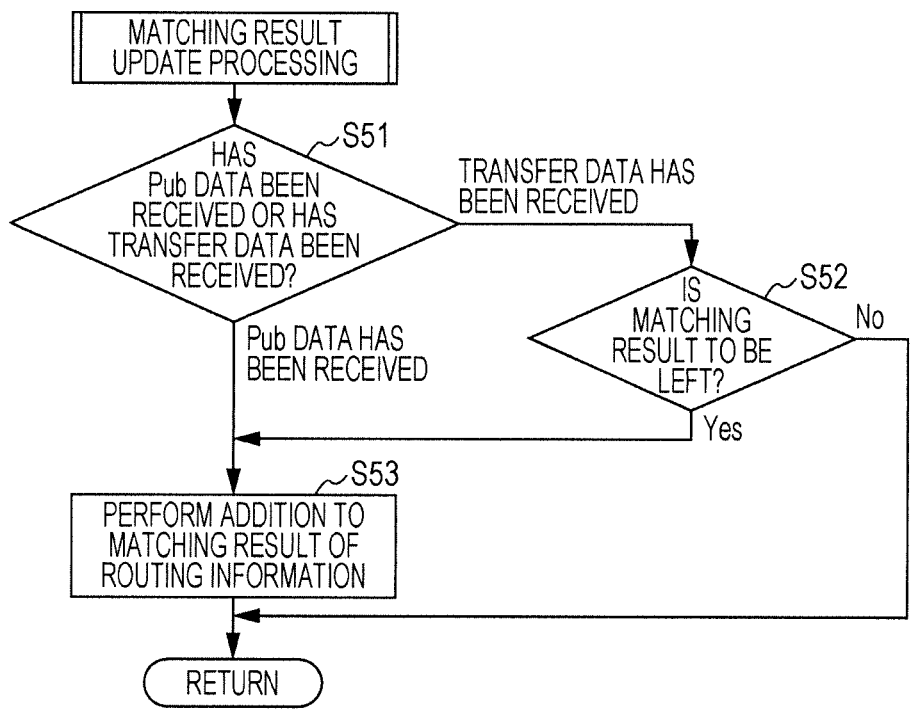
FIG. 9 is a diagram illustrating an example of an operational flowchart for matching result update processing, according to an embodiment.

Next, a flow of matching result update processing will be described. FIG. 9 is an example of an operational flowchart illustrating a flow of matching result update processing. As illustrated in FIG. 9, the real-time type data processing unit 24 determines whether or not the Pub data has been received or whether or not the transfer data has been received (Step S51) and, when the transfer data has been received, determines whether or not the matching result is to be left (Step S52). As a result, when the matching result is not to be left, the real-time type data processing unit 24 terminates processing.

On the other hand, when the matching result is to be left, or when the Pub data has been received, the real-time type data processing unit 24 adds a pair of the transfer source of data and the publication time of the data, to the matching result of the routing information (Step S53).

As described above, the real-time type data processing unit 24 adds the pair of the transfer source of the data and the publication time of the data, to the matching result of the routing information, and thereby, may efficiently perform retrieval of past data.

Figure 10:
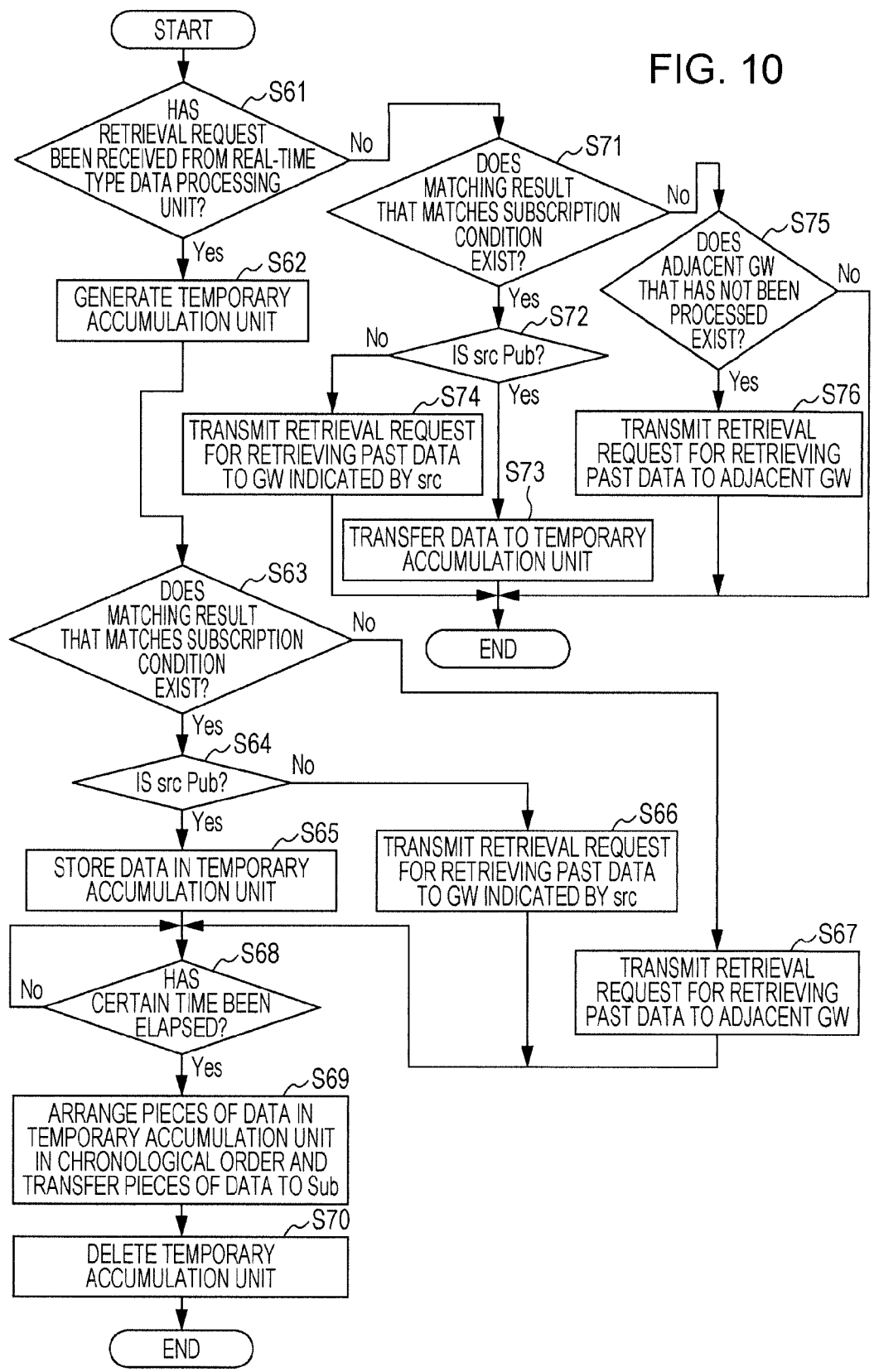
FIG. 10 is a diagram illustrating an example of an operational flowchart for processing of a retrieval request for retrieving past data, according to an embodiment.

Next, a flow of processing of a retrieval request for retrieving past data will be described. FIG. 10 is an example of an operational flowchart illustrating a flow of processing of a retrieval request for retrieving past data. As illustrated in FIG. 10, the past data processing unit 26 determines whether or not a retrieval request has been received from the real-time type data processing unit 24 (Step S61).

When the retrieval request has been received from the real-time type data processing unit 24, the past data processing unit 26 generates the temporary accumulation unit 27 (Step S62) and determines whether or not a matching result that matches the subscription condition exists (Step S63).

When the matching result that matches the subscription condition exists, the past data processing unit 26 determines whether or not src included in the matching result is the Pub 4 (Step S64). When src included in the matching result is the Pub 4, the past data processing unit 26 stores data in the temporary accumulation unit 27 (Step S65) and, when src included in the matching result is not the Pub 4, transmits a retrieval request for retrieving the past data to the GW 2 indicated by src (Step S66). On the other hand, when the matching result that matches the subscription condition does not exist, the past data processing unit 26 transmits the retrieval request for retrieving the past data to the adjacent GW 2 (Step S67).

Thereafter, the past data processing unit 26 determines whether or not a certain time has elapsed (Step S68) and repeats determination on whether or not the certain time has elapsed until the certain time elapses. While determination on whether or not the certain time has elapsed is repeated, when the past data is transmitted to the GW 2 including the generated temporary accumulation unit 27, from the GW 2 that has received the retrieval request for retrieving the past data, the past data processing unit 26 stores the past data in the temporary accumulation unit 27. When the certain time has elapsed, the past data processing unit 26 arranges pieces of data in the temporary accumulation unit 27 in chronological order, transfers the pieces of data to the Sub 5 (Step S69), and deletes the temporary accumulation unit 27 (Step S70).

When the retrieval request has not been received from the real-time type data processing unit 24 (No at Step 61), that is, when the retrieval request has been received from the adjacent GW 2, the past data processing unit 26 determines whether or not the matching result that matches the subscription condition exists (Step S71). When the retrieval request has been received from the real-time type data processing unit 24, the past data processing unit 26 determines whether or not src included in the matching result is the Pub 4 (Step S72). When src included in the matching result is the Pub 4, the past data processing unit 26 transfers data to the GW 2 including the temporary accumulation unit 27 (Step S73).

On the other hand, when src included in the matching result is not the Pub 4, the past data processing unit 26 transmits a retrieval request for retrieving the past data to the GW 2 indicated by src (Step S74). When the matching result that matches the subscription condition does not exist, the past data processing unit 26 determines whether or not an adjacent GW 2 that has not been processed exists (Step S75) and, when the adjacent GW 2 that has not been processed exists, transmits the retrieval request for retrieving the past data to the adjacent GW 2 (Step S76).

As described above, the past data processing unit 26 transmits the retrieval request for retrieving the past data to the GW 2 indicated by src included in the matching result, and thereby, may efficiently retrieve the past data.

As has been described above, in the embodiment, the routing information storage unit 25 stores the matching result in association with the match condition of the routing information. When the past data processing unit 26 of the GW 2 receives a request for subscription including subscription of the past data from the Sub 5, the past data processing unit 26 of the GW 2, which has received the subscription request, generates the temporary accumulation unit 27 and, when there is a matching result that matches the subscription condition, transmits a retrieval request for retrieving the past data to the GW 2 indicated by src included in the matching result.

Therefore, one of the GWs 2 transmits the retrieval request to only some of the other GWs 2, not all of the other GWs 2, and therefore, the past data may be efficiently retrieved.

Compared to a case where a delay queue is used, the past information providing system 1 is configured such that only the GW 2 that has received data from the Pub 4 stores the data, and therefore, the amount of the data that is to be held may be reduced to half.

In the embodiment, addition of a pair of the acquisition source and the publication time of data to the matching result is performed based on the probability calculated from the number of hops in which the data was transferred, and therefore, when the data is locally used, increase in retrieval time for retrieving the past data is not incurred even without increasing the amount of information held as the matching result.

Note that, although, in the embodiment, the GWs 2 each of which serves as a past information providing device have been described, a past information providing program which has a similar function may be achieved by realizing the configuration of the GWs 2 by a software. Therefore, a hardware configuration of the GWs 2 that execute the past information providing program will be described.

Figure 11:
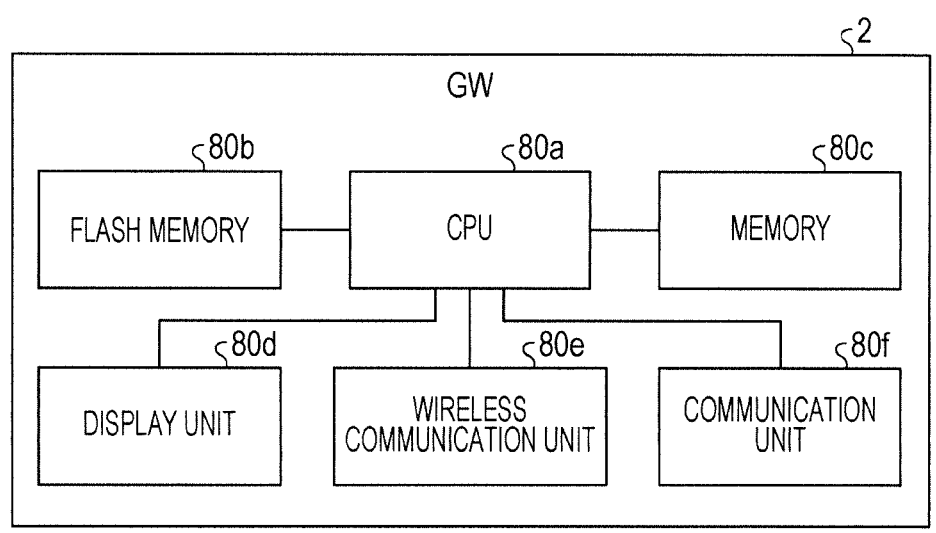
FIG. 11 is a diagram illustrating an example of a hardware configuration of a gateway, according to an embodiment.
Figure 12:
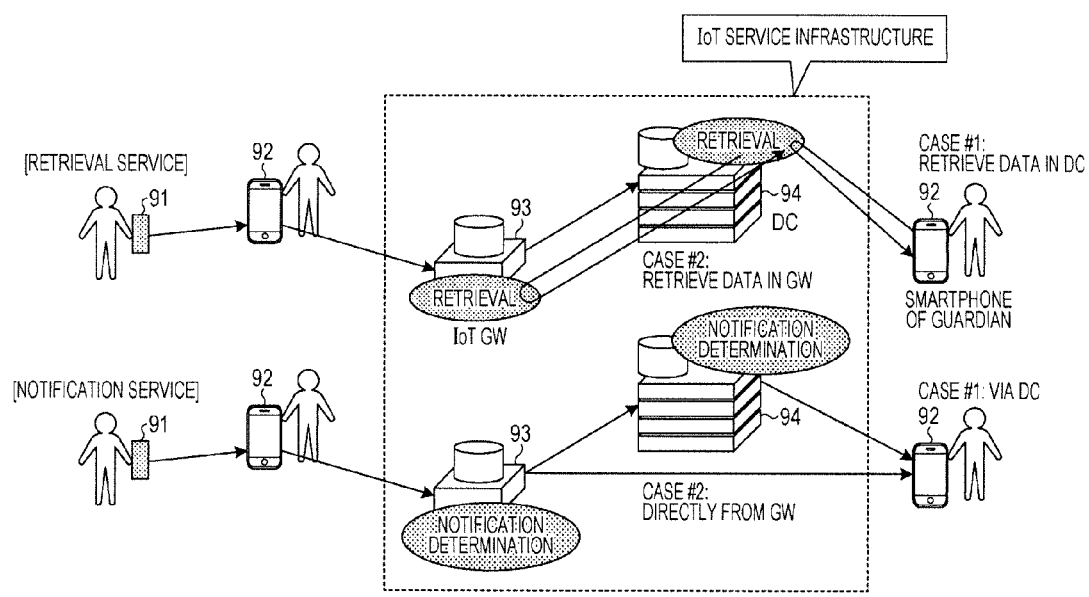
FIG. 12 is a diagram illustrating an example of a child watch system.
Figure 13:
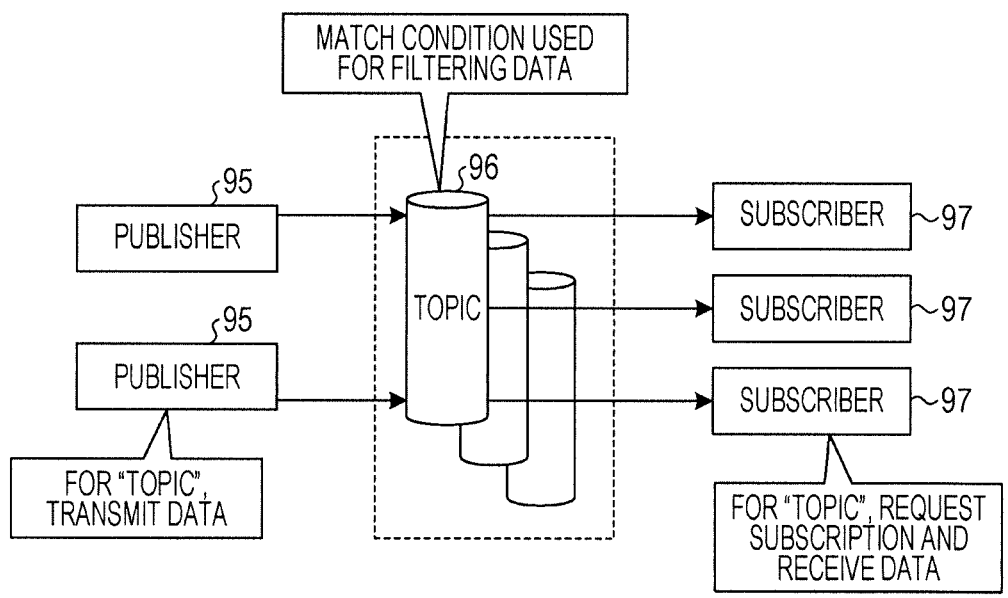
FIG. 13 is a diagram illustrating an example of a Pub/Sub system.
Figure 14:
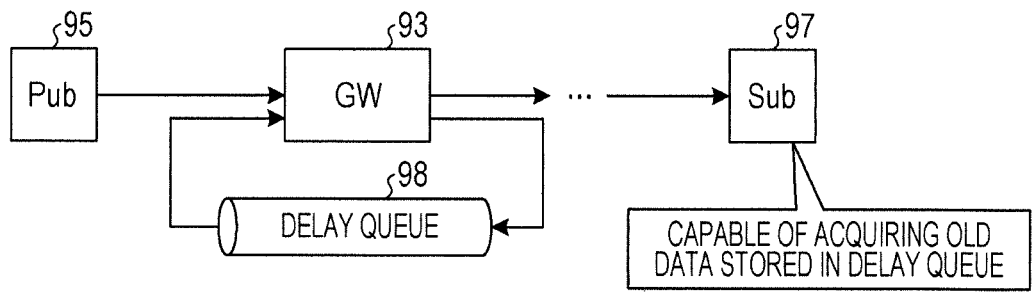
FIG. 14 is a diagram illustrating an example of a delay queue.

FIG. 11 is a diagram illustrating a hardware configuration of a GW 2. As illustrated in FIG. 11, the GW 2 includes a CPU 80a, flash memory 80b, memory 80c, a display unit 80d, a wireless communication unit 80e, and a communication unit 80f.

The CPU 80a is a processing device that reads out a program stored in the memory 80c and executes the program. The flash memory 80b is a nonvolatile memory that stores the past information providing program or the like.

The memory 80c is random access memory (RAM) that stores the past information providing program read out from the flash memory 80b. The memory 80c stores data used for executing the past information providing program, an interim result of the execution of the past information providing program, or the like.

The display unit 80d is a device that displays a screen output by the past information providing program and is, for example, a liquid crystal display device. The wireless communication unit 80e is a module that performs a wireless communication, such as a mobile phone communication or the like. The communication unit 80f is a module that performs a wired communication with another GW 2 or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory, computer-readable recording medium having stored therein a program for causing a computer included in each of gateway devices configured to transfer data between publisher devices and subscriber devices, to execute a process comprising:

upon receiving a first acquisition request for acquiring device information issued by the publisher devices, performing a routing-information update process including:
storing a pair of a matching condition and a transfer-destination address, as routing information, in a routing-information area of a memory of the each gateway device, the matching condition being a condition that is to be satisfied by device information for transferring the device information to a subscriber device that has issued the first acquisition request, and
transferring the first acquisition request to a predetermined gateway device adjacent to the each gateway device by setting an address of the each gateway to the transfer-destination address in the first acquisition request;

upon receiving device information from a publisher device, storing the received device information in a device-information area of the memory, in association with a reception time of receiving the device information from the publisher device, performing a matching-result addition process of adding, to the routing information, a matching result including a pair of an address of the publisher device as a source address of the device information and the reception time of the device information, and transferring the device information to a transfer destination whose address is stored as the routing information in association with the address of the publisher device;

upon receiving device information from a gateway device adjacent to the each gateway device, performing the matching result addition process of adding, to the routing information, a matching result including a pair of an address of the gateway device as a source address of the device information and a reception time of receiving the device information from the gateway device, and transferring the device information to a transfer destination whose address is stored as the routing information in association with the address of the gateway device; and upon receiving, from a subscriber device, a second acquisition request including a time condition related to past time, performing a past-data collecting process including:

generating, in the memory, a device-information accumulating area for accumulating device information that was received in past times, in relation to the second acquisition request, in a case where a matching result that satisfies the time condition included in the second acquisition request is stored as the routing information in the routing information area, transferring the second acquisition request to a gateway device of a source address associated with the matching result when the matching result does not indicate a publisher device, and reading out, from the device information area, device information that was received from the publisher device and stored in the device information area when the source address indicates a publisher device, and accumulating the device information in the device-information accumulating area, in a case where device information is acquired in response to the second acquisition request that has been transferred from the each gateway device, accumulating the acquired device information in the device-information accumulating area, and after a predetermined time has elapsed since the device-information accumulating area was generated, rearranging device information accumulated in the device-information accumulating area in chronological order, and transmitting the rearranged device information to the subscriber device.

2. The non-transitory, computer-readable recording medium of claim 1, wherein the matching-result addition process is performed based on a probability calculated from a number of hops through which device information is transferred.

3. A method performed by a computer included in each of gateway devices that transfer data between publisher devices and subscriber devices, the method comprising:

causing a first computer of a first gateway device to:

upon receiving a first acquisition request for acquiring device information issued by the publisher devices, perform a routing-information update process including:

storing a pair of a matching condition and a transfer-destination address, as routing information, in a routing-information area of a first memory of the first computer, the matching condition being a condition that is to be satisfied by device information for transferring the device information to a subscriber device that has issued the first acquisition request, and transferring the first acquisition request to a predetermined gateway device adjacent to the first gateway device by setting an address of the first gateway device to the transfer-destination address in the first acquisition request; and upon receiving, from a subscriber device, a second acquisition request including a time condition related to past time, perform a past-data collecting process including:

generating, in the first memory, a device-information accumulating area for accumulating device information that was received in past times, in relation to the second acquisition request, and in a case where a matching result that satisfies the time condition included in the second acquisition request is stored as the routing information in the routing information area, transferring the second acquisition request to a gateway device of a source address associated with the matching result when the source address does not indicate a publisher device, and reading out, from the device-information area of the first memory, device information that was received from the publisher device and stored in the device information area of the first memory when the source address associated with the matching result indicates a publisher device, and accumulating the device information in the device-information accumulating area of the first memory;

causing a second computer of a second gateway device to:

upon receiving device information from a publisher device, store the received device information in a device-information area of a second memory of the second gateway device, in association with a reception time of receiving the device information from the publisher device, perform a matching-result addition process of adding, to the routing information, a matching result including a pair of an address of the publisher device as a source address of the device information and the reception time of the device information, and transfer the device information to a transfer destination whose address is stored as the routing information in association with the address of the publisher device;

when receiving the second acquisition request from the first gateway device and a matching result that satisfies the time condition included in the second acquisition request is stored as the routing information in the routing information area, transfer the second acquisition request to a gateway device of a source address associated with the matching result when the source address does not indicate a publisher device, and read out, from the device-information area of the second memory, device information that has been received from the publisher device and stored in the device information area of the second memory, when the source address indicates a publisher device, and transfer the device information to the first gateway device; and causing the first computer of the first gateway device to:

upon receiving the device information from the second gateway device, accumulate the device information in the device-information accumulation area of the first memory of the first gateway device, and after a predetermined time has elapsed since the device-information accumulation area of the second memory was generated, arrange device information accumulated in the device-information accumulation area in chronological order, and transmit the rearranged second device information to the first subscriber device.

4. An apparatus configured to operate as each of gateway devices that transfer data between publisher devices and subscriber devices, the apparatus comprising:
- a memory configured to include a device information area for storing device information, and a routing-information area for storing routing information; and
- a processor coupled to the memory and configured to:
  - upon receiving a first acquisition request for acquiring device information issued by the publisher devices, perform a routing-information update process including:
    - storing a pair of a matching condition and a transfer-destination address, as routing information, in the routing-information area, the matching condition being a condition that is to be satisfied by device information for transferring the device information to a subscriber device that has issued the first acquisition request, and
    - transferring the first acquisition request to a predetermined gateway device adjacent to the apparatus by setting an address of the apparatus to the transfer-destination address in the first acquisition request;
  - upon receiving device information from a publisher device, store the received device information in the device-information area, in association with a reception time of receiving the device information from the publisher device, perform a matching-result addition process of adding, to the routing information, a matching result including a pair of an address of the publisher device as a source address of the device information and the reception time of the device information, and transfer the device information to a transfer destination whose address is stored as the routing information in association with the address of the publisher device;
  - upon receiving device information from a gateway device adjacent to the apparatus, perform the matching result addition process of adding, to the routing information, a matching result including a pair of an address of the gateway device as a source address of the device information and a reception time of receiving the device information from the gateway device, and transfer the device information to a transfer destination whose address is stored as the routing information in association with the address of the gateway device; and
  - upon receiving, from a subscriber device, a second acquisition request including a time condition related to past time, perform a past-data collecting process including:
    - generating, in the memory, the device-information accumulating area for accumulating device information that was received in past times, in relation to the second acquisition request,
    - in a case where a matching result that satisfies the time condition included in the second acquisition request is stored as the routing information in the routing information area, transferring the second acquisition request to a gateway device of a source address associated with the matching result when the source address does not indicate a publisher device, and reading out, from the device information area, device information that has been received from the publisher device and stored in the device information area when the source address associated with the matching result indicates a publisher device, and accumulating the device information in the device-information accumulating area,
    - in a case where device information is acquired in response to the second acquisition request that has been transferred from the apparatus, accumulating the acquired device information in the device-information accumulating area, and
    - after a predetermined time has elapsed since the device-information accumulating area was generated, rearranging device information accumulated in the device-information accumulating area in chronological order, and transmitting the rearranged device information to the subscriber device.

* * * * *